United States Patent
Chen et al.

(10) Patent No.: US 9,978,535 B2
(45) Date of Patent: May 22, 2018

(54) REDUCTION OF LEAKAGE CURRENT FROM SUPERCAPACITOR BY MODIFYING ELECTRODE MATERIAL

(71) Applicant: CYNTEC CO., LTD., Hsinchu (TW)

(72) Inventors: Yueh-Lang Chen, Hsinchu (TW); Ying-Da Luo, Hsinchu (TW); Jung-Yang Juang, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 0 days. days.

(21) Appl. No.: 14/931,554

(22) Filed: Nov. 3, 2015

(65) Prior Publication Data
US 2017/0125176 A1    May 4, 2017

(51) Int. Cl.
| | | |
|---|---|---|
| *H01G 11/28* | (2013.01) | |
| *H01G 11/38* | (2013.01) | |
| *H01G 11/52* | (2013.01) | |
| *H01G 11/58* | (2013.01) | |
| *H01G 9/00* | (2006.01) | |
| *H01M 4/13* | (2010.01) | |
| *H01M 4/60* | (2006.01) | |
| *H01G 11/86* | (2013.01) | |

(52) U.S. Cl.
CPC .............. *H01G 11/38* (2013.01); *H01G 11/28* (2013.01); *H01G 11/86* (2013.01)

(58) Field of Classification Search
CPC ........ H01G 11/28; H01G 11/52; H01G 11/58; H01G 11/38

USPC .......................... 361/502; 429/212, 213, 215
See application file for complete search history.

(56) References Cited

U.S. PATENT DOCUMENTS

| | | | |
|---|---|---|---|
| 2006/0263688 A1 | 11/2006 | Guyomard et al. | |
| 2011/0095626 A1 | 4/2011 | Shih et al. | |
| 2013/0286545 A1* | 10/2013 | Kojima .................. | H01G 11/06 361/528 |

FOREIGN PATENT DOCUMENTS

| | | |
|---|---|---|
| CN | 103247779 A | 8/2013 |
| CN | 104810154 A | 7/2015 |
| JP | S5052597 A | 5/1975 |

* cited by examiner

*Primary Examiner* — Eric Thomas
*Assistant Examiner* — Arun Ramaswamy
(74) *Attorney, Agent, or Firm* — Kirton McConkie; Evan R. Witt

(57) ABSTRACT

A composite material of an electrode unit includes: a porous electrode material being 50~95 wt % of the composite material; an electret material being greater than 0 wt % and less than 15 wt % of the composite material; a dispersant material being 0~15 wt % of the composite material; an adhesive material being 0~15 wt % of the composite material; an electric conduction auxiliary agent being greater than 0 wt % and less than 30 wt % of the composite material. The porous electrode material includes porous particles and the electret material is distributed among the porous particles.

10 Claims, 2 Drawing Sheets

… (1) …

REDUCTION OF LEAKAGE CURRENT FROM SUPERCAPACITOR BY MODIFYING ELECTRODE MATERIAL

FIELD OF THE INVENTION

The present invention relates to a composite material of an electrode, and more particularly to a composite material of an electrode unit of a supercapacitor. The present invention also relates to a method of producing an electrode unit made of the composite material. The present invention further relates to a supercapacitor including the electrode unit.

BACKGROUND OF THE INVENTION

A supercapacitor is a specific type of energy storage device which is getting more and more popular due to capabilities of high speed charging/discharging and high current/power output. A typical structure of a supercapacitor unit 10 of a supercapacitor is schematically shown in FIG. 1, which includes an anode 11, a cathode 12, a separator 13 and an electrolyte 14. Each of the anode 11 and the cathode 12 is made of activated carbon, which is porous so as to have relatively large area. The separator 13 is disposed between and separates the anode 11 and the cathode 12 for separation. The electrolyte 14 rinses the electrodes 11 and 12, and the separator 13. While being continuously supplied with a voltage, the electrodes 11 and 12 carry charges of different polarities, and the ions are then adsorbed onto the surfaces of the electrodes and accumulate. Afterwards, when the voltage supply is suspended, the anions and cations are released from the anode and the cathode, respectively. Meanwhile, a voltage between the electrodes 11 and 12 decreases gradually as a result of the self-discharging effect.

A supercapacitor, compared to conventional electrolytic capacitors, exhibits high charge-storage capacity due to the large overall surface area of the porous carbon material. Therefore, the charge-storage capacity of a supercapacitor can be up to thousands of the capacity of an electrolytic capacitor. Further compared to conventional lithium-ion batteries which conduct electrochemical conversion at the electrodes, the charge storage of a supercapacitor is implemented by physical adsorption. Therefore, a supercapacitor has a much higher charging/discharging speed, and is applicable to electric devices involving high current and high power output.

As described above, the operational principle of a supercapacitor is to physically adsorb ions onto electrodes for charging under a continuous voltage supply. Therefore, once the voltage supply is interrupted, the charges at the electrodes would be diminishing and the cations and anions would be desorbed from the electrodes. Then, the voltage between the electrodes would decrease gradually as self-discharging. As known, the self-discharging is relative to leakage current, and the leakage current would lower the charge-storage level of the supercapacitor. On the other hand, larger the leakage current requires more power for maintaining the voltage and results in less satisfactory electric performance of the supercapacitor.

SUMMARY OF THE INVENTION

Therefore, an object of the present invention is to reduce leakage current and lengthen retention of ions on the electrodes even if the voltage supply is interrupted. In other words, the present invention aims to enhance the capability of storing charges and improve performance of a supercapacitor.

In accordance with an aspect of the present invention, a composite material of an electrode unit includes: a porous electrode material being 50~95 wt % of the composite material; an electret material distributed among the porous particles of the porous electrode material for retaining charges on the electrode unit, and being greater than 0 wt % and less than 15 wt % of the composite material; a binder material binding the porous particles together and binding the electret material with the porous electrode material, and being greater than 0 wt % and less than 15 wt % of the composite material; and an electric conduction auxiliary agent for enhancing electric conduction of the electrode unit, being greater than 0 wt % and less than 30 wt % of the composite material.

Preferably, the porous electrode material is 60~90 wt % of the composite material, the electret material is 1 wt %~10 wt % of the composite material, and the electric conduction auxiliary agent is 1~25 wt % of the composite material. More preferably, the electret material is 5 wt % of the composite material.

In an embodiment, the binder material includes a dispersant material and/or an adhesive material.

Another aspect of the present invention relates to a supercapacitor, comprising an anode unit and a cathode unit, wherein at least one of the anode unit and the cathode unit comprises: a current collector material electrically coupled to a voltage supply; and the composite material as recited in claim 1, which is applied onto the current collector material for retaining polarized charges.

In an embodiment, the supercapacitor further comprises an electrolyte dipping thereinto the anode unit and the cathode unit, and a separator disposed between the anode unit and the cathode unit.

A further aspect of the present invention relates to a method of producing an electrode unit, which comprises steps of: binding an electric conduction auxiliary agent to a porous electrode material; binding an electret material to the porous electrode material; and applying the porous electrode material onto a current collector material, wherein a proportion of the porous electrode material is 50~95 wt % of a composite material; a proportion of the electret material is greater than 0 wt % and less than 15 wt % of the composite material; and a proportion of the electric conduction auxiliary agent is greater than 0 wt % and less than 30 wt % of the composite material. It is to be noted that execution of the above steps are not limited to the above-described order. Instead, it is possible to execute the steps depending on practical designs.

In an embodiment, the porous electrode material is applied onto the current collector material after the electret material and the electric conduction auxiliary agent are bound to the porous electrode material with a binder material. For example, the porous electrode material is mixed with the electret material to produce an activated porous electrode material modified with the electret material, and then mixed with the electric conduction auxiliary agent and the binder material.

In an embodiment, the electret material is bound to the porous electrode material by coating, spray, dipping, blend, or a combination thereof.

In an embodiment, the electric conduction auxiliary agent is bound to the porous electrode material before the porous electrode material is applied onto the current collector material, and the electret material is bound to the porous electrode material after the porous electrode material is applied onto the current collector material.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
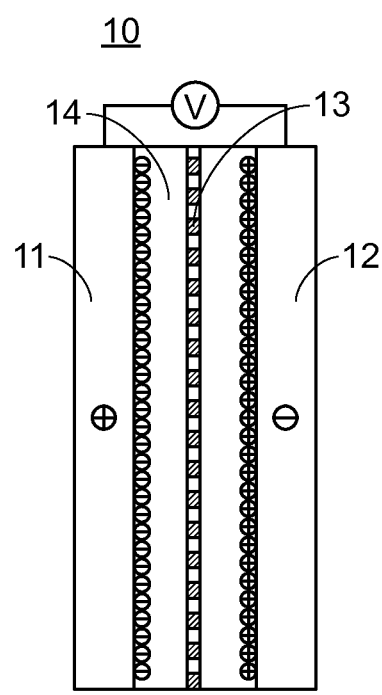
FIG. 1 is a schematic diagram illustrating a supercapacitor unit of a supercapacitor known in relate art.
Figure 2A:
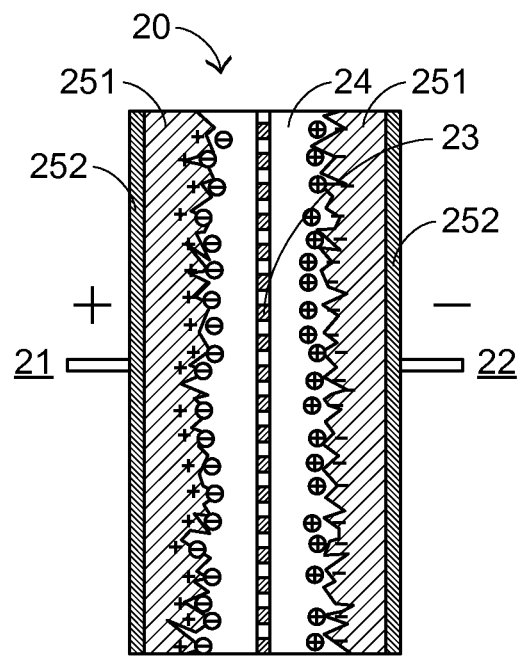
FIG. 2A is a schematic diagram illustrating a supercapacitor unit of a supercapacitor according to an embodiment of the present invention.

Referring to FIG. 2A, a supercapacitor unit of a supercapacitor according to an embodiment of the present invention is schematically illustrated. The structure of the supercapacitor unit 20 includes an anode 21, a cathode 22, a separator 23 and an electrolyte 24. Each of the anode 21 and the cathode 22 is constructed by applying a porous electrode material 251 onto a conductive current-collecting substrate 252. The separator 23 is disposed between and separates the anode 21 and the cathode 22. The electrolyte 24 rinses the electrodes 21 and 22, and the separator 23. While being continuously supplied with a voltage V, the electrodes 21 and 22 carry charges of different polarities, and the ions are then adsorbed onto the surfaces of the electrodes and accumulate. Afterwards, when the voltage supply V is suspended, the anions and cations are released from the anode and the cathode, respectively. Meanwhile, a voltage decrease gradually as a result of the self-discharging effect. According to the present invention, the porous electrode material 251 is modified with an electret material 253 for facilitating retention of the polarized charges. With the improvement of the charge-retention ability, leakage current can be reduced so as to enhance the charge-storage capability and thus promote performance of the supercapacitor. The combination of the porous electrode material 251 with the electret material 253 is schematically illustrated in FIG. 2B, and will be described hereinafter.

Figure 2B:
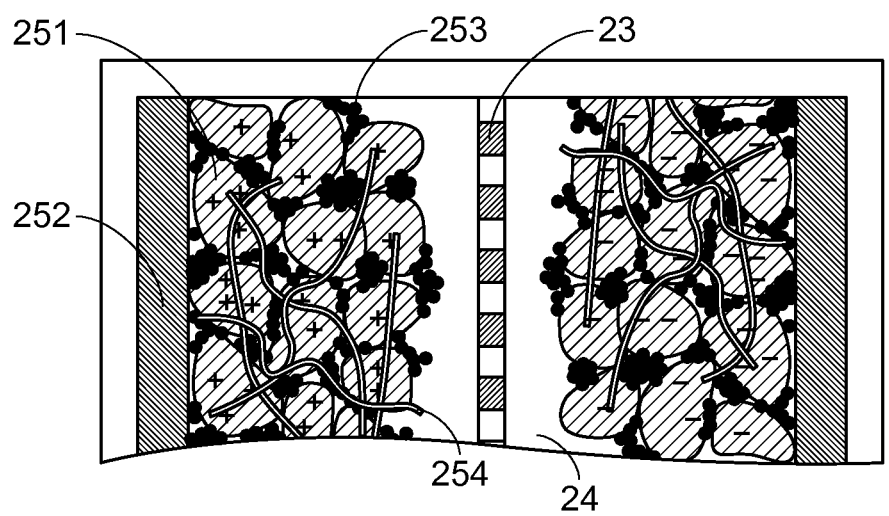
FIG. 2B is a schematic diagram illustrating a composite material of the supercapacitor unit shown in FIG. 2A.

Referring to the embodiment shown in FIG. 2B, the porous electrode material 251 is provided in the form of particles, and the electret material 253 are distributed among the particles of the porous electrode material 251. Specifically, the electret material 253 may be bound onto the outer surfaces of the particles of the porous electrode material 251 as well as the internal surfaces of the pores. The binding ways of the electret material 253 to the porous electrode material 251 are various, depending on practical requirements and conditions. For example, the binding ways may include coating, spray, dipping, blend, and a combination thereof. It is to be noted that the binding ways listed above are just for exemplification and should be selected depending on a variety of conditions such as the porous electrode material 251 and the electret material 253. If helpful to retention of polarized charges, more than two kinds of porous electrode material 251 and/or more than two kinds of electret material 253 may also be used, and adequate binding way or ways may be adopted.

The binding effect of the electret material 253 to the porous electrode material 251 may be further enhanced by way of an adhesive material. Furthermore, it is preferable, but not necessary, that the electret material 253 and the porous electrode material 251 are dispersed in a dispersant material for binding treatment. Furthermore, adhesion with an adhesive material may optionally accompany the dispersion of the electret material 253 and the porous electrode material 251 in order to enhance the binding effect. It is also feasible to use a proper adhesive material to bind the electret material 253 to the porous electrode material 251 without dispersion, depending on practical requirements and conditions. Lines 254 in FIG. 2B schematically illustrate the binding of modified the porous electrode material 251 with the adhesive material and/or dispersant material.

In addition to the conductive current-collector substrate, porous electrode material, electret material, dispersant material and adhesive material, the composite material of the electrode unit preferably further contains an electric conduction auxiliary agent for facilitating the work of the supercapacitor. The proportions and species will be exemplified hereinafter.

A variety of porous material may be used in the composite material of the electrode unit according to the present invention. Porous carbon material is a currently preferred option, but other organic or inorganic porous material may also be used, depending on practical requirements and conditions. Examples of the porous carbon material include activated carbon and its derivatives, carbon nanotube and its derivatives, graphene and its derivatives, micro-crystallite carbon C60 and its derivatives, carbon fiber and its derivatives, and mixtures of two or more of the aforementioned material. The proportion of the porous electrode material in the composite material is about 50 wt %~95 wt %, and preferably 60 wt %~90 wt %. Examples of the electric conduction auxiliary agent include conductive carbon black, graphite, carbon fiber, derivatives thereof and mixtures thereof. The proportion of the electric conduction auxiliary agent in the composite material is about 0~30 wt %, and preferably 1~25 wt %. Examples of the dispersant material include polyacrylic acid and it derivatives, polyvinyl alcohol and its derivatives, methyl cellulose and its derivatives, carboxymethyl cellulose and its derivatives, alginic acid and its derivatives, polyvinylidenefluoride and its derivatives, acrylic resin and its derivatives, and mixtures of one or more of the aforementioned material. The proportion of the dispersant material in the composite material is about 0~15 wt %, and preferably 1 wt %~10 wt %. Examples of the adhesive material include polypropylene resin and its derivatives, polystyrene-butadiene resin and its derivatives, acrylic resin and its derivatives, polytetrafluoroethene and its derivatives, and mixtures of one or more of the aforementioned material. The proportion of the adhesive material in the composite material is about 0~15 wt %, and preferably 1 wt %~10 wt %. The dispersant material and the adhesive material may both exist in the combination, or only one of them is used. Examples of the electret material include polypropylene and its derivatives, polycarbonate and its derivatives, fluoro resin and its derivatives, polyethyleneterephtalate and its derivatives, and mixtures of one or more of the aforementioned material. The proportion of the electret material in the composite material is less than about 15 wt %, preferably less than about 10 wt %, and more preferably about 5 wt %.

Hereinafter, examples of preparation of the composite material of the electrode unit as well as the production and test of the electrode unit are given. The order of adding those components and the means for combining those components to form the composite material may vary, depending on practical requirements and conditions.

In Example 1, 87 g activated carbon (Product Code YP-80, Kuraray Co., Ltd., Japan), which serves as a porous electrode material, 8 g carbon black (Product Code XC72, Cabot Corporation, USA), which serves as an electric conduction auxiliary agent, 2 g sodium carboxymethyl cellulose (Hercules Chemical Co., USA), which serves as a dispersant material, and 3 g adhesive (Product Code 102A, JSR Corporation, Japan) are mixed with 300 g deionized water, and then coated onto a current collector aluminum foil to form an electrode substrate. After being dried, the electrode substrate is further dipped into 5 wt % polycarbonate in dimethyl acetamide, which serves as an electret material, for about 60 seconds, and dried to complete producing the electrode unit. For testing the effect of the supercapacitor unit including the above electrode unit, a pair of the dried electrode units are dipped into the electrolyte solution, e.g. 1M TEMABF$_4$/AN (triethylmethylammonium tetrafluoroborate/acetonitrile), and subjected to a continuous voltage supply (Ag/Ag$^+$=+0.4V) at 65 Celsius degrees for 2 hours. The measurement of the resulting leakage current shows a reduction from 0.16 µA to 0.14 µA. Furthermore, the measurement of the leakage current on a condition of a continuous voltage supply (Ag/Ag$^+$=−2.5V) at 65 Celsius degrees for 2 hours shows a reduction from 0.4 µA to 0.35 µA.

In Example 2, 65 g activated carbon (Product Code YP-80, Kuraray Co., Ltd., Japan), which serves as a porous electrode material, 25 g carbon black (Product Code XC72, Cabot Corporation, USA), which serves as an electric conduction auxiliary agent, 4 g sodium carboxymethyl cellulose (Hercules Chemical Co., USA), which serves as a dispersant material, and 6 g adhesive (Product Code 102A, JSR Corporation, Japan) are mixed with 300 g deionized water, and then coated onto a current collector aluminum foil to form an electrode substrate. After being dried, the electrode substrate is further uniformly sprayed with 5 wt % polyvinylidenefluoride-polyhexafluoropropylene in acetone, which serves as an electret material, and dried to complete producing the electrode unit. For testing the effect of the supercapacitor unit including the above electrode unit, a pair of the dried electrode units are dipped into the electrolyte solution, e.g. 1M TEMABF$_4$/AN (triethylmethylammonium tetrafluoroborate/acetonitrile), and subjected to a continuous voltage supply (Ag/Ag$^+$=+0.4V) at 65 Celsius degrees for 2 hours. The measurement of the resulting leakage current shows a reduction from 0.16 µA to 0.13 µA. Furthermore, the measurement of the leakage current on a condition of a continuous voltage supply (Ag/Ag$^+$=−2.5V) at 65 Celsius degrees for 2 hours shows a reduction from 0.4 µA to 0.35 µA.

In Example 3, 100 g activated carbon (Product Code YP-80, Kuraray Co., Ltd., Japan), which serves as a porous electrode material, and 5 g polypropylene particles, which serve as an electret material, are well mixed and blended at 240 Celsius degrees, thereby producing activated carbon electrode material modified with electret material. Afterwards, 80 g activated carbon electrode material modified with electret material, 10 g carbon black (Product Code XC72, Cabot Corporation, USA), which serves as an electric conduction auxiliary agent, 5 g sodium carboxymethyl cellulose (Hercules Chemical Co., USA), which serves as a dispersant material, and 5 g adhesive (Product Code 102A, JSR Corporation, Japan) are mixed with 300 g deionized water, and then coated onto a current collector aluminum foil. After being dried, an electrode unit is obtained. For testing the effect of the supercapacitor unit including the above electrode unit, a pair of the dried electrode units are dipped into the electrolyte solution, e.g. 1M TEMABF$_4$/AN (triethylmethylammonium tetrafluoroborate/acetonitrile), and subjected to a continuous voltage supply (Ag/Ag$^+$=+0.4V) at 65 Celsius degrees for 2 hours. The measurement of the resulting leakage current shows a reduction from 0.16 µA to 0.14 µA. Furthermore, the measurement of the leakage current on a condition of a continuous voltage supply (Ag/Ag$^+$=−2.5V) at 65 Celsius degrees for 2 hours shows a reduction from 0.4 µA to 0.34 µA.

In each of the above embodiments, only one kind of electret material is used in the same supercapacitor unit. Alternatively, more than one kind of electret material may be used, depending on practical requirements and conditions. It does not require that the electret material used in the present invention carries its own charges, but the electret material should exhibit the property of attracting and retaining space charges.

It can be seen from the above examples that the leakage current can be ameliorated by using any of the modified supercapacitor units according to the present invention. In other words, the charge-retaining capability is improved and thus, when applied to a supercapacitor, the electric performance of the supercapacitor can also be improved.

It is to be noted that the composite material according to the present invention, in addition to the application to an electrode of a supercapacitor, may be alternatively applied onto other polarized surfaces requiring retention of polarized charges.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A composite material of an electrode unit, comprising:
  a porous electrode material including porous particles and being 50~95 wt % of the composite material;
  an electret material distributed among the porous particles of the porous electrode material for retaining charges on the electrode unit, and being greater than 0 wt % and less than 15 wt % of the composite material, wherein the electret material is selected from a group consisting of polypropylene, polycarbonate, polyethyleneterephthalate, derivatives thereof, and mixtures thereof;
  a binder material binding the porous particles together and binding the electret material with the porous electrode material, and being greater than 0 wt % and less than 15 wt % of the composite material; and
  an electric conduction auxiliary agent for enhancing electric conduction of the electrode unit, being greater than 0 wt % and less than 30 wt % of the composite material.

2. The composite material according to claim 1, wherein the porous electrode material is 60~90 wt % of the composite material, the electret material is 1 wt %~10 wt % of the composite material, and the electric conduction auxiliary agent is 1~25 wt % of the composite material.

3. The composite material according to claim 2, wherein the electret material is 5 wt % of the composite material.

4. The composite material according to claim 1, wherein the porous carbon material is selected from a group consisting of activated carbon, carbon nanotube, graphene, micro-crystallite carbon C60, carbon fiber, derivatives thereof, and mixtures thereof.

5. The composite material according to claim 1, wherein the electric conduction auxiliary agent is selected from a group consisting of carbon black, graphite, carbon fiber, derivatives thereof and mixtures thereof.

6. The composite material according to claim 1, wherein the binder material includes a dispersant material, which is selected from a group consisting of polyacrylic acid, polyvinyl alcohol, methyl cellulose, carboxymethyl cellulose, alginic acid, polyvinylidenefluoride, acrylic resin, derivatives thereof, and mixtures thereof, and is 0~15 wt % of the composite material.

7. The composite material according to claim 1, wherein the binder material includes an adhesive material, which is selected from a group consisting of polypropylene resin, polystyrene-butadiene resin, acrylic resin, polytetrafluoroethene, derivatives thereof, and mixtures thereof, and is 0~15 wt % of the composite material.

8. A supercapacitor, comprising an anode unit and a cathode unit, wherein at least one of the anode unit and the cathode unit comprises:
   a current collector material electrically coupled to a voltage supply; and
   the composite material as recited in claim 1, which is applied onto the current collector material for retaining polarized charges.

9. The supercapacitor according to claim 8, further comprising an electrolyte dipping thereinto the anode unit and the cathode unit, and a separator disposed between the anode unit and the cathode unit.

10. A composite material of an electrode unit, comprising:
   a porous electrode material including porous particles and being 50~95 wt % of the composite material;
   an electret material distributed among the porous particles of the porous electrode material for retaining charges on the electrode unit, and being about 5 wt % of the composite material;
   a binder material binding the porous particles together and binding the electret material with the porous electrode material, and being greater than 0 wt % and less than 15 wt % of the composite material; and
   an electric conduction auxiliary agent for enhancing electric conduction of the electrode unit, being greater than 0 wt % and less than 30 wt % of the composite material.

* * * * *